L. J. JOHNSON.
GRAIN RENOVATOR AND DRIER.
APPLICATION FILED MAR. 10, 1908.
985,416.
Patented Feb. 28, 1911.
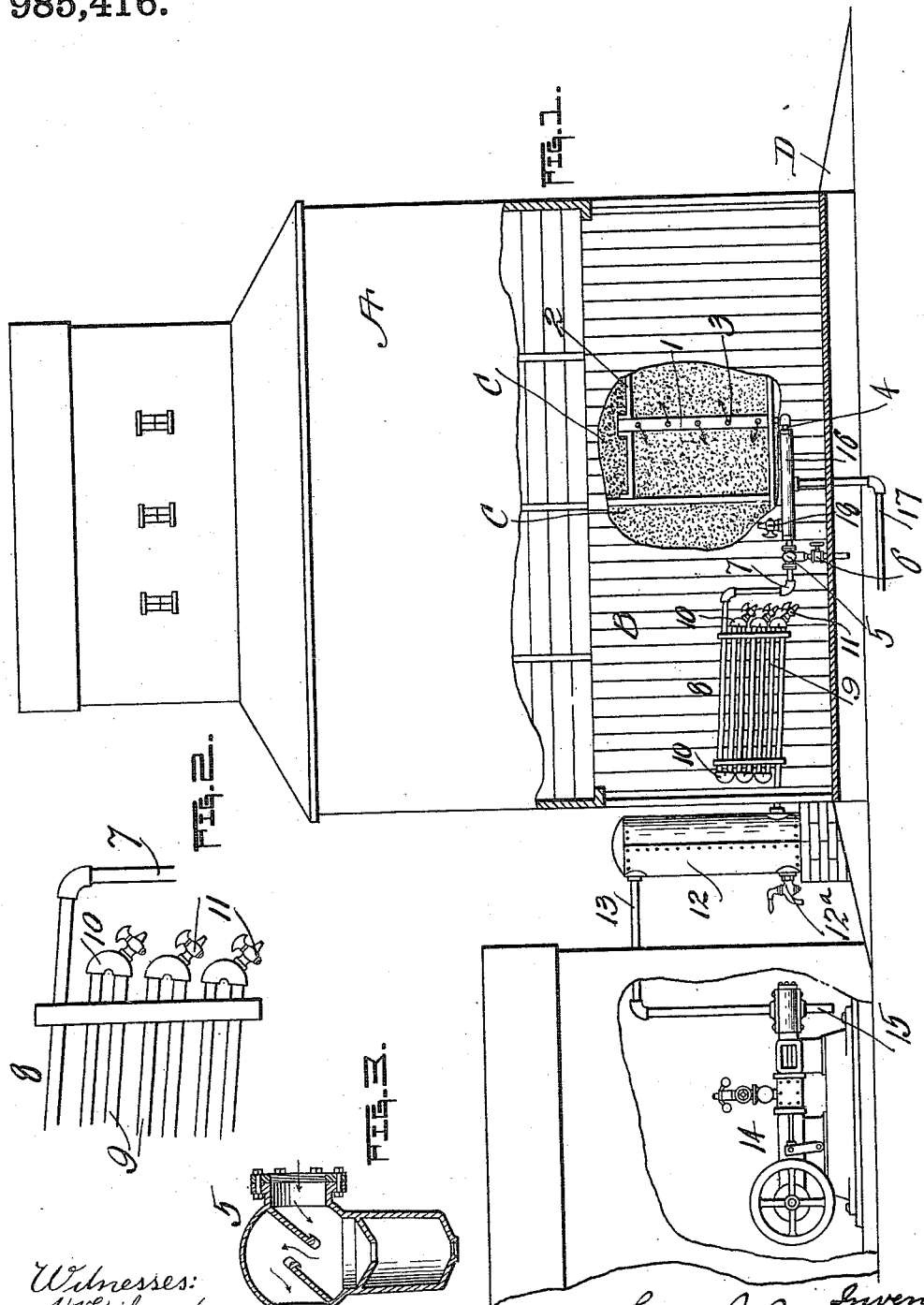

UNITED STATES PATENT OFFICE.

LEWIS J. JOHNSON, OF SPRINGBAY, ILLINOIS.

GRAIN RENOVATOR AND DRIER.

985,416.  Specification of Letters Patent.  Patented Feb. 28, 1911.

Application filed March 10, 1908. Serial No. 420,286.

*To all whom it may concern:*

Be it known that I, LEWIS J. JOHNSON, a citizen of the United States, residing at Springbay, in the county of Woodford and State of Illinois, have invented certain new and useful Improvements in Grain Renovators and Driers; and I do hereby declare that the following is a full, clear, and exact description of the invention, which will enable others skilled in the art to which it appertains to make and use the same.

This invention has reference to a new and improved grain renovator and drier, being an apparatus to be employed for cooling and drying grain and is applicable for use in connection with any elevator, corn-crib, oat or wheat bin, or any receptacle for storing grain.

To this end the main and primary object of the invention is to provide an improved grain ventilating apparatus whereby a thorough ventilation and cooling of the grain in a bin is secured, by forcing through said grain a suitable quantity of cold dry air by means of a compressor, a receiver, a coil, a suitable trap and feeders associated with said aforementioned apparatus which enter discharge casings suitably placed in a bin or bins; thereby cooling and drying the grain in a remarkably short time, preventing it from becoming overheated, and souring. The compressor, as will be understood, not only supplies the air but the power sufficient to force said air through the grain to be cooled and ventilated; the receiver not only acts as a reservoir, but absorbs the pulsation of the compressor and will retain a great quantity of the moisture condensed from the air and the receiver is provided with a valve, whereby the moisture may be drawn from the receiver; the coil supplements the receiver as a cooling agent, and also retains moisture, which may be drawn off from said coils through valves provided for this purpose, while the trap insures the final deposit of any extraneous substances and oil which may travel with the air, just prior to the air entering the bins, thoroughly dried and tempered, in which condition it must be, otherwise the proper cooling and ventilating of the grain will have failed.

With these and many other objects in view which will readily appear as the nature of the invention is better understood, the same consists in the novel construction, combination and arrangement of parts hereinafter more fully described.

In the accompanying drawings, Figure 1 is a view in elevation, partly in section, of an elevator with my improved apparatus applied thereto; Fig. 2 is a detail elevation of a portion of the coil, and Fig. 3 is an enlarged sectional detail of the trap.

The art to which this invention pertains, discloses that several attempts have been made to provide an apparatus for the purpose of cooling and drying grain in bins of elevators or other storehouses for this purpose; but, for a number of reasons, which will become apparent, none of these devices have had any practical utility whatever.

It is well known to those handling grain, that when large quantities are stored, either in bins or elevators or storehouses used for this purpose, because of the water contained in the grain, it becomes heated, resulting in it becoming moldy, unless changed or ventilated in some manner so as to allow the heated air and sweat to escape. Unless it can be ventilated in some such manner and by some such apparatus as I employ, the grain must be changed from one bin to another, or otherwise moved about, and this is often impracticable, owing to the labor and expense involved and the lack of room. If properly handled and ventilated, the grain may be kept in good condition for a considerable length of time and it will grade much better and very quickly.

Referring to the drawings, A denotes an elevator which represents one of the usual construction, having a central passageway B and on opposite sides thereof, bins C, those on one side only being shown, and an approach D leads to said elevator, as shown. In Fig. 1, the wall portion of one of the bins of the elevator has been broken away disclosing a casing 1, preferably an elongated tubular casing which extends up from the bottom of the bin and braced at its upper end by braces 2, and the wall of said casing is provided with a plurality of perforations 3, through which air passing into said casing may escape, as indicated by the arrows in said figure. While I prefer to show the casing as elongated and tubular, it is to be understood that any suitable casing such as will produce the results herein desired may be substituted; also, that while only one bin is shown provided with a perforated casing, there may be one or more for each of said bins, and connections made with the feed to be described for admitting air to said casings.

Entering through the floor or partition of the bin supporting the casing 1 is a discharge pipe, feed or lateral 4, which also enters into and extends through said casing a suitable distance, to insure the proper circulation of air into and through the casing and out through its perforations. The feed pipe or lateral 4 leads to and communicates with a suitable trap 5, provided with a valved outlet 6, and from said trap leads a feed 7, which may be considered as an extension of the feed or lateral 4, and said extension leads to, communicates with and forms a part of a coil 8 composed preferably of a plurality of inclined sections or pipes 9 overlying one another and joined at their matching ends by elbows 10; the elbows at the lowermost ends of said sections or pipes provided with suitable cocks 11, for purposes to be further explained. The interior construction of the trap 5 is seen in Fig. 3 and it is understood that any trap which will accomplish the purposes herein desired may be substituted. The coil 8 may be preferably disposed within the passageway of the elevator or at some other desirable point, with its receiving end preferably leading without the elevator and connected with an air receiver 12, at or near its lower end, which said receiver is preferably disposed out of doors, and connected to and communicating with the upper end of said receiver 12 is a feed pipe 13, preferably somewhat of a larger diameter than the pipe leading therefrom to the coil 8; this last mentioned pipe 13 leads to and is connected with a compressor 14. A compressor of the type shown is intended to drive from 29 to 109 cubic feet of cold dry air per minute through the grain, this is absolutely a necessity, owing to the quantity of grain which must be cooled, considering that there is usually from three thousand to ten thousand bushels of grain in a bin, and any force less than provided by an air compressor will be absolutely useless. The compressor is shown located in an out building, such as an engine-room, but may be located in any other convenient or desirable place.

The operation of supplying and forcing cold dry air into and through the grain may be the better understood from the following brief description: The compressor 14 is of the steam actuated type, although may be otherwise driven, taking in air through the intake 15 and forcing the same into and through the feed pipe 13 leading from said compressor and communicating with the receiver 12. This receiver absorbs the pulsation of the compressor and receives a portion of the moisture that is condensed from the air, which being precipitated will accumulate in the bottom of the receiver and may be drawn therefrom through the valve 12$^a$. During the completion stage of compressing the air in the compressor, the air is heated and after it leaves the compressor and before it reaches the receiver, considerable of the heat caused by the compressor has a chance to radiate from the pipe through which it passes to the atmosphere, but during this portion of the travel of the air, all the moisture in the air has not been accumulated, so it passes to the receiver, thence into the coil 8, the sections of which are preferably disposed at an incline, with suitable cocks at the lowest points of said sections, whereby all moisture which accumulates in said pipes may be drawn off from time to time and the purpose of the trap 5 is to provide a last step in the process of detaining all moisture, oil or other extraneous substances which may be carried along with the air and thus insure the air which is forced into and through the grain being thoroughly cooled and dried. It will be noticed, that the trap is placed at the lowermost point in the travel of the air through the feed, being below the plane of the lowest cock of the coil, thereby insuring a deposit or precipitation in the manner and for the purposes explained.

If it should prove desirable, which it may under certain conditions, to heat the air passing through the feeder which is to be discharged into the bin of grain through the perforated casing 1, I provide a steam drum or jacket 16 which may be of any suitable length and diameter, through which the feed pipe 4 is carried, preferring to locate said steam drum or jacket at a point in proximity to where the feed pipe 4 enters the casing 1. A feeder 17 communicates with said drum and may be connected with any suitable steam supply, preferably with a supplier which is capable of feeding what is termed dry steam to said drum or jacket, for by feeding dry steam, there will be very little precipitation. A suitable steam cock 18 is connected with said drum or jacket 16 and may be so regulated as to allow for the escape of the steam from the drum or jacket, as it may be desired. Passing the air through a feed pipe, which is surrounded by a steam drum or jacket, as I have shown, will heat the same to a suitable temperature before it enters the bin of grain through the casing 1 and the temperature of said air more or less raised according to the velocity at which it is passed through the feed pipe 4.

Having thus fully described my invention what I claim and desire to secure by Letters Patent of the United States, is:—

1. The herein described system of ventilation for grain in bins, consisting of a perforated casing to be supported within a bin containing the grain, an air compressor for compressing and forcing air into said bin through the aforesaid casing, a feed pipe leading from said compressor, a receiver connected to said feed pipe, a pipe joined to said receiver above the bottom thereof, said last named pipe forming the lowermost one of a plurality of overlying parallel coil sections disposed at an incline, a pipe leading from the uppermost of said coil sections, a trap in said last named pipe and provided with a relief valve, and a connection between said last named pipe and said casing.

2. The herein described system of ventilation for grain in bins, consisting of a perforated casing to be supported within a bin containing the grain, an air compressor for compressing and forcing air into said bin through the aforesaid casing, a feed pipe leading from said compressor, a receiver connected to said feed pipe, a pipe joined to said receiver above the bottom thereof, said last named pipe forming the lowermost one of a plurality of overlying parallel coil sections disposed at an incline and having at their lowermost points relief cocks whereby moisture precipitated in said coil may be drawn off, a pipe leading from the uppermost of said coil sections, a trap in said last named pipe and provided with a relief valve, and a connection between said last named pipe and said casing.

3. The herein described system of ventilation for grain in bins, consisting of a perforated casing to be supported within a bin containing the grain, an air compressor for compressing and forcing air into said bin through the aforesaid casing, a feed pipe leading from said compressor, a receiver connected to said feed pipe, a pipe joined to said receiver above the bottom thereof, said last named pipe forming the lowermost one of a plurality of overlying parallel coil sections disposed at an incline and having at their lowermost points relief cocks whereby moisture precipitated in said coil may be drawn off, a pipe leading from the uppermost of said coil sections, a trap in said last named pipe and provided with a relief valve, said last named pipe being connected to said casing and being provided with air tempering means intermediate the casing and the trap.

4. The herein described system of ventilation for grain in bins, comprising an upright elongated tubular casing provided with perforations, transversely extending braces connected to the upper end of the casing supporting the casing within the bin, an air compressor for compressing and forcing air into said bin through the aforesaid casing, a feed pipe leading from said compressor, a receiver connected to said feed pipe, a pipe joined to said receiver above the bottom thereof, said last named pipe forming the lowermost one of a plurality of overlying parallel coil sections disposed at an incline, a pipe leading from the uppermost of said coil sections, a trap in said last named pipe and provided with a relief valve, said last named pipe extending up into said casing.

In testimony whereof I affix my signature, in presence of two witnesses.

LEWIS J. JOHNSON.

Witnesses:
  ROBERT N. McCORMICK,
  CHAS. W. LA PORTE.

---

Copies of this patent may be obtained for five cents each, by addressing the "Commissioner of Patents, Washington, D. C."